US012720004B2

(12) United States Patent
Shin

(10) Patent No.: US 12,720,004 B2
(45) Date of Patent: Aug. 25, 2026

(54) AUTOMATICALLY GENERATING COLORS FOR OVERLAID CONTENT OF VIDEOS

(71) Applicant: Google LLC, Mountain View, CA (US)

(72) Inventor: Dongeek Shin, San Jose, CA (US)

(73) Assignee: Google LLC, Mountain View, CA (US)

(*) Notice: Subject to any disclaimer, the term of this patent is extended or adjusted under 35 U.S.C. 154(b) by 184 days.

(21) Appl. No.: 18/342,140

(22) Filed: Jun. 27, 2023

(65) Prior Publication Data

US 2025/0008051 A1 Jan. 2, 2025

(51) Int. Cl.

| | |
|---|---|
| ***H04N 5/265*** | (2006.01) |
| ***G06T 7/90*** | (2017.01) |
| ***G06V 10/25*** | (2022.01) |
| ***G06V 10/44*** | (2022.01) |
| ***G06V 10/56*** | (2022.01) |
| ***H04N 21/2743*** | (2011.01) |

(52) U.S. Cl.
CPC ............... *H04N 5/265* (2013.01); *G06T 7/90* (2017.01); *G06V 10/25* (2022.01); *G06V 10/44* (2022.01); *G06V 10/56* (2022.01); *H04N 21/2743* (2013.01); *G06T 2207/10024* (2013.01)

(58) Field of Classification Search
CPC ...... H04N 5/265; H04N 21/2743; G06T 7/90; G06T 2207/10024; G06V 10/25; G06V 10/44; G06V 10/56
See application file for complete search history.

(56) References Cited

U.S. PATENT DOCUMENTS

| | | | | |
|---|---|---|---|---|
| 10,109,092 | B1 | 10/2018 | Hitchings, Jr. | |
| 2016/0227134 | A1* | 8/2016 | Voss | G06T 11/001 |
| 2019/0371267 | A1* | 12/2019 | Clawges | H04N 21/431 |
| 2021/0264161 | A1* | 8/2021 | Saraee | G06V 10/776 |
| 2021/0303905 | A1 | 9/2021 | Baek | |
| 2021/0312672 | A1* | 10/2021 | Luo | G06T 11/00 |
| 2021/0390745 | A1* | 12/2021 | Rykhliuk | G06N 20/00 |
| 2022/0058340 | A1 | 2/2022 | Aggarwal et al. | |
| 2022/0207875 | A1* | 6/2022 | Kopparapu | G06N 20/00 |
| 2022/0261128 | A1* | 8/2022 | Zadeh | G06F 16/74 |
| 2023/0326488 | A1* | 10/2023 | Liu | G11B 27/031<br>386/209 |

OTHER PUBLICATIONS

Chi, "Experimenting with Automatic Video Creation from a Web Page—Google AI Blog," Google Research, Oct. 29, 2020, 6 pages. https://ai.googleblog.com/2020/10/experimenting-with-automatic-video.html.
Qiu, et al., "Color Recommendation for Vector Graphic Documents based on Multi-Palette Representation," arXiv:2209.10820v1 [cs. CV], Sep. 22, 2022, 9 pages. https://arxiv.org/abs/2209.10820.

* cited by examiner

*Primary Examiner* — Michelle Chin
(74) *Attorney, Agent, or Firm* — Lowenstein Sandler LLP

(57) ABSTRACT

Methods and systems for color recommendations for overlaid text in a video are provided herein. A video for upload is received. The video includes a plurality of frames having overlaid content. Data related to the video is provided as input to a machine learning model. One or more outputs obtained from the machine learning model is used to determine a color value that improves one or more presentation characteristics of the overlaid content within the video. A color associated with the determined color value is provided to a user for the overlaid content.

20 Claims, 5 Drawing Sheets

AUTOMATICALLY GENERATING COLORS FOR OVERLAID CONTENT OF VIDEOS

TECHNICAL FIELD

Aspects and implementations of the present disclosure relate to automatically generating colors for overlaid content of media items.

BACKGROUND

Content creators may utilize a platform (e.g., a content platform) to transmit (e.g., stream) media items to client devices connected to the platform via a network. A media item can include a video and/or an audio item, in some instances. Users can consume the transmitted media items via a user interface (UI) provided by the platform. In some instances, a media item, such as a video, may have overlaid text, and the user may wish to improve the presentation characteristics of the overlaid content of the media item to avoid an experience with degraded text intelligibility.

SUMMARY

The below summary is a simplified summary of the disclosure to provide a basic understanding of some aspects of the disclosure. This summary is not an extensive overview of the disclosure. It is intended neither to identify critical elements of the disclosure, nor to delineate any scope of the particular implementations of the disclosure or any scope of the claims. Its sole purpose is to present some concepts of the disclosure in a simplified form as a prelude to the more detailed description that is presented later.

In some implementations, a system and method are disclosed for color recommendations for overlaid text. In an implementation, a method includes receiving, via a user interface, a video for upload, wherein the video comprises a plurality of frames having overlaid content. The method further includes providing data related to the video comprising the plurality of frames having the overlaid content as input to a machine learning model. The method further includes obtaining one or more outputs of the machine learning mode. The method further includes determining, based on the one or more outputs of the machine learning mode, a color value that improves one or more presentation characteristics of the overlaid content within the video. The method further includes providing, via the user interface, a recommended color for the overlaid content based on the determined color value.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
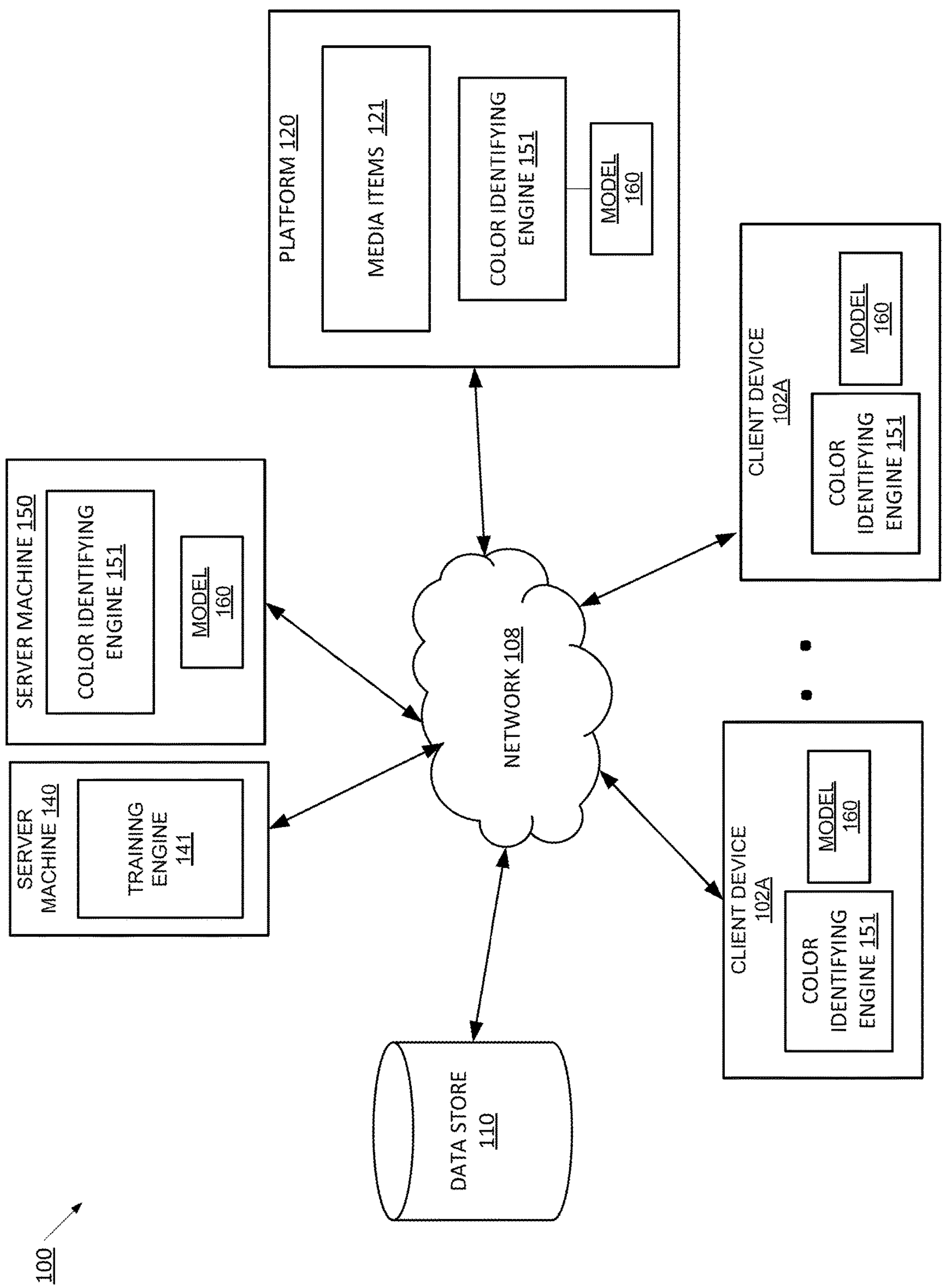
FIG. 1 illustrates an example system architecture, in accordance with implementations of the present disclosure.

Aspects of the present disclosure relate to color recommendations for overlaid text in a video. A platform (e.g., a content platform, etc.) can enable a content creator to upload a media item (e.g., a video) for consumption by another user of the platform. For example, a first user, such as a content creator, can provide (e.g., upload) a media item to a content platform to be available to other users. A second user of the content platform can access the media item provided by the first user via a user interface (UI) provided by the content platform at a client device associated with the second user. In some instances, a media item can include overlaid text with additional information about the media item, such as a media item title, description of the media item, comments associated with the media item, etc. This overlaid text can be specifically useful with short-form versions of videos that are becoming increasingly popular. A short-form version can refer to a brief, concise, and quickly consumable video clip of reduced duration (e.g., less than 60 seconds in length). Such a video clip can be intended for content viewing via, for example, a mobile device (e.g., a smartphone), necessitating presentation of additional information about a video clip as an overlaid text (rather than a separate region of the screen), for better use of screen space and improved viewing experience.

In some instances, the content creator may modify the contents of the overlaid text. However, the overlaid text's visual representation (e.g., color) is typically immutable in existing content platforms. The overlaid text is usually presented in a default color, such as white. Due to the placement of the overlaid text (e.g., a lower portion of the media item) and the default color of the overlaid text, presentation characteristics of the overlaid text (e.g., intelligibility, sharpness, etc.) may be affected based on the color of the video behind the overlaid text being relatively similar to the default color of the overlaid text. This can cause frustration for the user and further burden the user with additional tasks (e.g., trying to modify the color of the video, removing the overlaid text, etc.) that unnecessarily consume computing resources, thereby decreasing overall efficiency and increasing overall latency of the platform.

Aspects of the present disclosure address the above and other deficiencies by providing suitable colors for overlaid content of a media item. Content creator can upload a media item, such as a video, to a platform for access by users. The video may include multiple frames including overlaid content. A color identifying engine can generate data related to the video's frames having the overlaid content, provide this data as input to a machine learning model, and obtain an output of the machine learning model to determine a color value that improves presentation characteristics of the overlaid content.

In some embodiments, generating the data related to the frames having the overlaid content includes identifying the overlaid content in each frame of the video, drawing a bounding box around each portion of overlaid content in a frame, obtaining a color value associated with the color of each pixel within each bounding box, and creating a feature vector based on the color values of the pixels within each bounding box enclosing a corresponding portion of the overlaid content. In some embodiments, creating a feature vector involves calculating an average color value associated with the pixels within a bounding box for each bounding box of a frame, calculating an average of the average color values of the bounding boxes within a frame, and aggregating the average of the average color values of the bounding boxes within each frame into the feature vector.

The feature vector can then be provided as input into the machine learning model trained to predict a color that would improve the presentation characteristics (e.g., intelligibility, sharpness, etc.) of the overlaid content of the video. The predicted color can then be provided to the content creator as an option to revise the original color of the overlaid content. The content creator may decide to change the color of the overlaid content in the video to the predicted color and improve the presentation characteristics of the overlaid content of the video.

Aspects of the present disclosure cover techniques that enable users of a platform to modify the original color of overlaid content of a video to improve the presentation characteristics of the overlaid content, thereby increasing the enjoy ability and immersion of the video by users. Further, aspects of the present disclosure provide an overlaid content coloring strategy to a user automatically using a trained machine learning model that predicts a color which can optimize the visual experience for a specific video (e.g., short-form video), instead of the existing approach that uses the same color (e.g., white color) for all videos of the platform. This can avoid unnecessary consumption of resources for supporting iterative manual modifications that a user would need to do to obtain a suitable modified video item. Furthermore, by preprocessing data provided as input into the machine learning model, the size of the machine learning model can be reduced, thereby resulting in more efficient use of processing resources and making the disclosed technique to be suitable for use on client devices with limited processing power (e.g., mobile phones).

Although the description herein often refers to video as an example type of media item, it is appreciated that aspects and implementations of the present disclosure can apply to other types of media items such as images, documents, and other media without deviating from the scope of the present disclosure.

FIG. 1 illustrates an example system architecture 100, in accordance with implementations of the present disclosure. The system architecture 100 (also referred to as "system" herein) includes client devices 102A-N, a data store 110, a platform 120, and/or a server machine 150, each connected to a network 108. In implementations, network 108 can include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In some embodiments, platform 120 can be a content sharing platform that allows users to consume, upload, share, search for, approve of ("like"), dislike, and/or comment on media items 121. Platform 120 can include a website (e.g., a webpage) or application back-end software used to provide a user with access to media items 121 (e.g., via client devices 102A-N). A media item 121 can be consumed via the Internet or via a mobile device application, such as a content viewer (not shown) of client device 102A-N. In some embodiments, a media item 121 can correspond to a media file (e.g., a video file, and audio file, etc.). In other or similar embodiments, a media item 121 can correspond to a portion of a media file (e.g., a portion or a chunk of a video file, an audio file, etc.). As discussed previously, a media item 121 can be requested for presentation to users of the platform by a user of the platform 120. As used herein, "media," media item," "online media item," "digital media," "digital media item," "content," and "content item" can include an electronic file that can be executed or loaded using software, firmware or hardware configured to present the digital media item to an entity. In one implementation, the platform 120 can store the media items 121 using the data store 110. In another implementation, the platform 120 can store media item 121 or fingerprints as electronic files in one or more formats using data store 110. Platform 120 can provide media item 121 to a user associated with a client device (e.g., client device 102A) by allowing access to media item 121 (e.g., via a content sharing platform application), transmitting the media item 121 to the client device 102A, and/or presenting or permitting presentation of the media item 121 at a display device of client device 102A.

In some embodiments, media item 121 can be a video item. A video item refers to a set of sequential video frames (e.g., image frames) representing a scene in motion. For example, a series of sequential video frames can be captured continuously or later reconstructed to produce animation. Video items can be provided in various formats including, but not limited to, analog, digital, two-dimensional and three-dimensional video. Further, video items can include movies, video clips, video streams, or any set of images (e.g., animated images, non-animated images, etc.) to be displayed in sequence. In some embodiments, a video item can be stored (e.g., at data store 110) as a video file that includes a video component and an audio component. The video component can include video data that corresponds to one or more sequential video frames of the video item. The audio component can include audio data that corresponds to the video data.

In some implementations, data store 110 is a persistent storage that is capable of storing data as well as data structures to tag, organize, and index the data. Data store 110 can be hosted by one or more storage devices, such as main memory, magnetic or optical storage based disks, tapes or hard drives, NAS, SAN, and so forth. In some implementations, data store 110 can be a network-attached file server, while in other embodiments, data store 110 can be some other type of persistent storage such as an object-oriented database, a relational database, and so forth, that may be hosted by platform 120 or one or more different machines coupled to the platform 120 via network 108. Data store 110 can include a media cache that stores copies of media items that are received from the platform 120. In one example, media item 121 can be a file that is downloaded from platform 120 and can be stored locally in media cache. In another example, media item 121 can be streamed from platform 120 and can be stored as an ephemeral copy in memory of one or more of server machine 130-150.

The client devices 102A-N can each include computing devices such as personal computers (PCs), laptops, mobile phones, smartphones, tablet computers, netbook computers, network-connected televisions, etc. In some implementations, client devices 102A-N may also be referred to as "user devices." Client devices 102A-N can include a content viewer. In some implementations, a content viewer can be an application that provides a user interface (UI) for users to view or upload content, such as images, videos, web pages, documents, etc. For example, the content viewer can be a web browser that can access, retrieve, present, and/or navigate content (e.g., web pages such as Hyper Text Markup Language (HTML) pages, digital videos, etc.) served by a web server. The content viewer can render, display, and/or present the content to a user. The content viewer can also include an embedded media player (e.g., a Flash® player or an HTML5 player) embedded in a web page (e.g., a web page that may provide information about a product sold by an online merchant). In another example, the content viewer can be a standalone application (e.g., a mobile application or app) that allows users to view digital videos (e.g., digital videos, digital images, electronic books, etc.). According to aspects of the disclosure, the content viewer can be a content platform application for users to record, edit, and/or upload content for sharing on platform 120. As such, the content viewers and/or the UI associated with the content viewer can be provided to client devices 102A-N by platform 120. In one example, the content viewers may be embedded media players that are embedded in web pages provided by the platform 120.

Platform 120 can include multiple channels (e.g., channels A through Z). A channel can include one or more media items 121 available from a common source or media items 121 having a common topic, theme, or substance. Media item 121 can be digital content chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channels in which they are interested. The concept of "subscribing" can also be referred to as "liking," "following," "friending," and so on.

In some embodiments, system 100 can include one or more third party platforms (not shown). In some embodiments, a third party platform can provide other services associated with media items 121. For example, a third party platform can include an advertisement platform that can provide video and/or audio advertisements. In another example, a third party platform can be a video streaming service provider that provides a media streaming service via a communication application for users to play videos, TV shows, video clips, audio, audio clips, and movies, on client devices 102 via the third party platform.

In some embodiments, a client device 102 can transmit a request to platform 120 for access to a media item 121. Platform 120 can identify the media item 121 of the request (e.g., at data store 110, etc.) and can provide access to the media item 121 via the UIs of the content viewers provided by platform 120. In some embodiments, the requested media item 121 can have been generated by another client device 102A-N connected to platform 120. For example, client device 102A can generate a video item (e.g., via an audio-visual component, such as a camera, of client device 102A) and provide the generated video item to platform 120 (e.g., via network 108) to be accessible by other users of the platform. In other or similar embodiments, the requested media item 121 can have been generated using another device (e.g., that is separate or distinct from client device 102A) and transmitted to client device 102A (e.g., via a network, via a bus, etc.). Client device 102A can provide the video item to platform 120 (e.g., via network 108) to be accessible by other users of the platform, as described above. Another client device, such as client device 102B, can transmit the request to platform 120 (e.g., via network 108) to access the video item provided by client device 102A, in accordance with the previously provided examples.

As illustrated in FIG. 1, platform 120 can include a color identifying engine 151. Depending on the embodiment, color identifying engine 151 may be separate from platform 120 at server machine 150. Color identifying engine 151 may receive a video uploaded by a content creator (e.g., an uploaded video 121) to be consumed via the Internet or via a mobile device application, such as a content viewer of client devices 102A-N. Uploaded video 121 may correspond to a short-form video, long-form video, live video (or stream), 360-degree video, interactive video, branded video, documentary video, etc. In some embodiments, the uploaded video 121 may store, or references to, the uploaded video 121, using the data store 110 in at least one implementation.

The uploaded video 121 may include overlaid content (e.g., one or more overlaid text items). In particular, during the presentation of uploaded video 121, in the content viewer provided by platform 120, additional information pertaining to uploaded video 121 can be positioned over (e.g., be overlaid on top of) uploaded video 121. The additional information may include overlaid text items such as a title of the uploaded video 121, a description of the uploaded video 121, comment(s) representing a response or reaction by other users of platform 120 that are viewing or that viewed uploaded video 121, etc. As previously noted, the overlaid text items may be modified by the content creator and/or users of platform 120. For example, during the creation or upload of the uploaded video 121, the content creator may provide (or assign) a title and description to the uploaded video 121 to orient users of platform 120 to the uploaded video 121. In another example, after uploading the uploaded video 121, users of platform 120 may engage with the uploaded video 121 via comments representing the user's reaction or sentiments toward the uploaded video 121.

Color identifying engine 151 can automatically provide a recommended color for the overlaid content of video 121. In particular, color identifying engine 151 can generate data related to the video's frames having the overlaid content, provide this data as input to a machine learning model 160, and obtain an output of the machine learning model 160 to determine a color value that improves presentation characteristics of the overlaid content. Color identifying engine 151 may generate the above data by, for example, identifying one or more overlaid text portions in each of the frames of video 121. For example, color identifying engine 151 may use text recognition technique(s) to locate and identify overlaid text of a frame. Text recognition technique(s) can include optical character recognition (OCR), template matching, features extraction, neural networks, Hidden Markov Models (HMM), Support Vector Machine (SVM), Convolutional Neural Networks (CNNs), Recurrent Neural Networks (RNNs), or any other machine learning or techniques suitable for text recognition. Depending on the embodiment, color identifying engine 151 may have access to raw text input associated with the overlaid text items and video arrangement physics implemented by platform 120. Accordingly, rather than identifying the overlaid text items of each frame using OCR, color identifying engine 151 may locate and identify the overlaid text items based on the raw text input and video arrangement physics.

Color identifying engine 151 may draw a plurality of bounding boxes for each frame. Each bounding box of the plurality of bounding boxes of a frame (e.g., each bounding box of a frame) is drawn around an overlaid text of the frame. The bounding box may be a rectangular region around an object of interest (e.g., overlaid text item) in an image or video (e.g., frame of video 121) and can be defined by its coordinates (e.g., the (x, y) position of the top-left corner of the box) and its width and height. Depending on the embodiment, color identifying engine 151 may determine the size of the bounding box based on the number of pixels associated with the overlaid text. In particular, color identifying engine 151 may draw the bounding box with a specific size, a specific dimension (specific height and width), and/or a specific location in which the number of pixels associated with the frame of video 121 exceeds the number of pixels associated with the overlaid text. Depending on the embodiment, the size and dimension may be dictated by a predetermined ratio (1.1:1) indicating the number of pixels associated with the frame of video 121 (1.1 pixels of the frame of video 121) that should be included in the bounding box for a pixel associated with the overlaid text (1 pixel of the overlaid text).

Color identifying engine 151 may obtain an average color value for each bounding box of the plurality of bounding boxes of a frame (e.g., a bounding box average color value). Color identifying engine 151 may traverse through each pixel of the bounding box to obtain a corresponding color value. The color value is a color representation defined by a color model (e.g., RGB, CMYK, HSL, HSZ, YUV, etc.). The color value may define colors in one or more component values. The one or more component values may be represented using an alphanumeric value indicating the intensity of the component. For example, the color model may be RGB, in which the color value defines color using a red component, a green component, and a blue component. Each component can be represented using an integer value between 0 and 255. Color identifying engine 151 can calculate an average of all color values obtained from the bounding box to arrive at a bounding box average color value for the bounding box. Depending on the embodiment, averaging a color value may include averaging each component individually. Color identifying engine 151 may obtain a frame average color value for each frame of video 121. Color identifying engine 151 may calculate an average of all the bounding box average color values of a frame to arrive at a frame average color value for the frame. Color identifying engine 151 may aggregate the frame average color value from the plurality of frames of video 121 into a feature vector (e.g., data related to video 121) that can be provided as input into machine learning model 160. In some embodiments, color identifying engine 151 may reduce the length of the feature vector using a predetermined feature length (e.g., by employing a universal, fixed-length histogram feature vector). Accordingly, color identifying engine 151 may use any suitable conceivable method to reduce the length of the feature vector in view of a predetermined feature length (e.g., first set selection, last set selection, random selection, sampling, stratified selection, etc.). As a result, the inference phase can be very short (e.g., about a few milliseconds when executed by a CPU of a smartphone representing client device 102).

The machine learning model 160 can be a fully connected neural network with one or more hidden layers of fully connected neurons between an input layer and an output layer, such as a multilayer perceptron (MLP). Depending on the embodiment, the fully connected neural network may be optimized for fast execution by model compression, quantization, and hardware acceleration, which can reduce the size and complexity of the machine learning model to provide short inferencing with low latency and quick response times based on a small amount of input data. For example, the fully connected neural network may include roughly 5 layers and 100 weights dispersed across the 5 layers.

In some embodiments, the output layer may be a linear output layer that receives the output of the final hidden layer without any nonlinear transformation. The linear output layer may perform a weighted sum of the inputs from the final hidden layer, with each weight representing the contribution of the corresponding neuron in the hidden layer to the final output. The output of the linear layer may not be constrained to any specific range or form and can take on any real value (e.g., a component of the color value). In some embodiments, the output layer may be a layer with a neuron (or node) for each component of the color value (e.g., 3 neurons for the RGB color model). Thus, the output of each neuron of the output layer can produce a value for each component of the color value associated with the color model.

In some embodiments, the system 100 includes a server machine 140 hosting a training engine 141 that can train machine learning model 160 based on training data. The training data used to train the machine learning model 160 may include known videos with overlaid text and corresponding ideal color values. Ideal color values may be data obtained from the physics of visual perception and/or surveyed labels. The physics of visual perception provides insight into the physical processes underlying visual perception, which includes how light interacts with the eye and how neural signals are processed in the visual system. More specifically, it provides insight into the relationship between the physical properties of visual stimuli, such as light intensity, wavelength, and spatial frequency, and the resulting perception of those stimuli (e.g., what is displayed vs. how it is perceived). Thus, the data associated with the physics of visual perception may provide insight into the ideal color values for known videos within overlaid text. The surveyed labels represent color labels assigned to corresponding overlaid text items by humans or a set of potential color recommendations through crowdsourcing. The labels may be binary (positive/negative) indications of the ideal color values, numerical (rating, scoring, or ranking) indications of a set of potential color values from the most ideal color values to the least ideal color values, etc. Thus, the data associated with surveyed labels may provide insight into human judgment, expertise, or interpretation of the ideal color recommendations for the known videos with overlaid text. Accordingly, training engine 141 may train the machine learning model 160 using the training data to receive a feature vector (e.g., a plurality of frame average color values associated with a video) and predict each component associated with a recommended color value. Depending on the embodiment, the machine learning model 160 may be trained offline.

Color identifying engine 151 may generate the feature vector (or reduced feature vector) as discussed herein and apply the trained machine learning model 160 to the feature vector. The trained machine learning model 160 may output one or more values, each associated with a component of a recommended color value. For example, the trained machine learning model 160 may produce 3 outputs (a value for the red component of an RGB color model, a value for the green component of an RGB color model, and a value for the blue component of an RGB color model). Color identifying engine 151 may receive the one or more outputs and determine a color value. For example, color identifying engine 151 may combine the one or more outputs to represent the recommended color value. Color identifying engine 151 may identify a color associated with the recommended color value in view of the corresponding color model. Color identifying engine 151 may provide, via a user interface, the identified color as a color to use for each overlaid text item in the video. Color identifying engine 151 may receive from a user of platform 120 an indication to update the color of the overlaid text of video 121 with the recommended color. Depending on the embodiment, color identifying engine 151 may further provide a default color or an arbitrary color in addition to the recommended color. Thus, based on the selection of the user of the platform, color identifying engine 151 may update the color of the overlaid text within video 121 with the selected color. Furthermore, any newly added overlaid text (e.g., new comments) may be automatically updated to be presented (or displayed) based on the selected color.

In some embodiments, color identifying engine 151 can generate and provide a color for overlaid content of a video in response to a user request (e.g., via a user interface). The user may be a content creator or another user of platform 120. If the content creator is the user, the color identifying engine 151 may generate a recommended color for video 121 after upload but before publishing video 121 on platform 120. If the user is a user other than the content creator, the color identifying engine 151 may generate a recommended color for video 121 after the upload and publishing of video 121 on platform 120 by the content creator. Alternatively, color identifying engine 151 can generate and provide a color for overlaid content of a video when a content creator uploads the video and without a specific user request.

Depending on the implementation, color identifying engine 151 can be part of platform 120, can reside on one or more server machines that are remote from platform 120 (e.g., server machine 150), or can reside on client devices 102A-102N. It should be noted that in some other implementations, the functions of server machines 140, 150 and/or platform 120 can be provided by a fewer number of machines. For example, in some implementations, components and/or modules of any of server machines 140 and 150 can be integrated into a single machine, while in other implementations components and/or modules of any of server machines 140 and 150 can be integrated into multiple machines. In addition, in some implementations, components and/or modules of any of server machines 140 and 150 can be integrated into platform 120.

In general, functions described in implementations as being performed by platform 120 and/or any of server machines 140 and 150 can also be performed on the client devices 102A-N in other implementations. In addition, the functionality attributed to a particular component can be performed by different or multiple components operating together. Platform 120 can also be accessed as a service provided to other systems or devices through appropriate application programming interfaces, and thus is not limited to use in websites.

Although implementations of the disclosure are discussed in terms of platform 120 and users of platform 120 accessing a video item, implementations can also be generally applied to media items generally. Further, implementations of the disclosure are not limited to content sharing platforms that allow users to generate, share, view, and otherwise consume media items such as video items.

In implementations of the disclosure, a "user" can be represented as a single individual. However, other implementations of the disclosure encompass a "user" being an entity controlled by a set of users and/or an automated source. For example, a set of individual users federated as a community in a social network can be considered a "user." In another example, an automated consumer can be an automated ingestion pipeline of platform 120.

Further to the descriptions above, a user can be provided with controls allowing the user to make an election as to both if and when systems, programs, or features described herein can enable collection of user information (e.g., information about a user's social network, social actions, or activities, profession, a user's preferences, or a user's current location), and if the user is sent content or communications from a server. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. Thus, the user can have control over what information is collected about the user, how that information is used, and what information is provided to the user.

Figure 2:
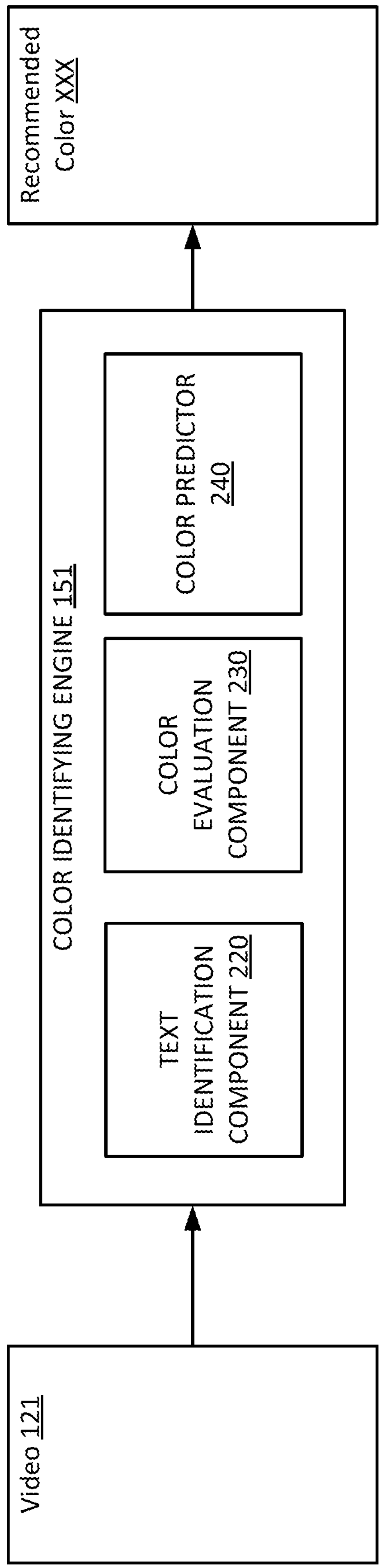
FIG. 2 is a block diagram illustrating an example color identifying engine, in accordance with implementations of the present disclosure.

FIG. 2 is a block diagram illustrating an example color identifying engine 151, in accordance with implementations of the present disclosure. As described with respect to FIG. 1, color identifying engine 151 can receive a video 121 and provide a recommended color 280 to revise a color of overlaid within the video. In an illustrative example, color identifying engine 151 can include a text identification component 220, a color evaluation component 230, and a color predictor 240.

Text identification component 220 may split video 121 into a plurality of frames. Text identification component 220 may identify a subset of the plurality of frames, including overlaid text. For each frame of the subset, text identification component 220 may identify one or more overlaid text items in the respective frame. Text identification component 220 may draw a bounding box around each of the one or more overlaid text items in the respective frame.

The color evaluation component 230 may receive the subset from the text identification component 220. For each frame of the subset, the color evaluation component 230 may obtain a frame average color value. Frame average color value, as previously described, is determined by the color evaluation component 230 by obtaining an average of all the bounding box average color values in a respective frame. Each bounding box's average color value is determined by the color evaluation component 230 by obtaining an average color value of a respective bounding box in the respective frame. For example, a bounding box in a frame of the subset is analyzed pixel by pixel by the color evaluation component 230 to determine a color value for each pixel in the bounding box. The color evaluation component 230 can calculate an average of the color value of all the pixels in the bounding box to obtain a bounding box average color value.

The color predictor 240 may receive a plurality of frame average color values associated with the subset from color evaluation component 230. The color predictor 240 may process the plurality of frame average color values for input as a feature vector to a trained machine learning model. The color predictor 240 may reduce the feature vector based on a predetermined feature length. The color predictor 240 may provide the feature vector into the trained machine learning model. The trained machine learning model may return one or more outputs, each associated with a component of a color value associated with the recommended color 280. The color predictor 240 may aggregate the one or more outputs into a color value and determine the recommended color associated with the color value generated from the aggregated one or more outputs. The color predictor 240 may provide the recommended color 280 as the color for each overlaid text item in video 121.

In some embodiments, color identifying engine 151 may include a component used to revise and update each overlaid text in video 121. Accordingly, the component of color identifying engine 151 may receive a selection of a color (e.g., recommended color 280, a default color, or arbitrary color) and revise and/or update the color of the overlaid text within video 121.

Figure 3:
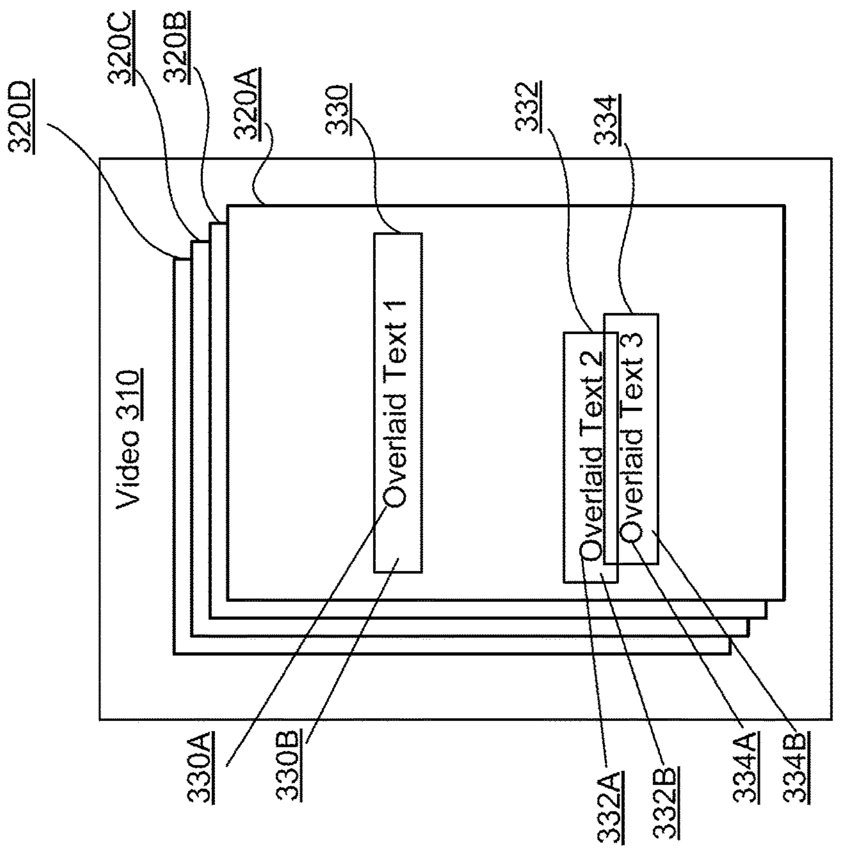
FIG. 3 illustrate an example of the processing of a video by the color identifying engine, in accordance with implementations of the present disclosure.

FIG. 3 illustrates an example of the processing of video 121 by the color identifying engine 151, in accordance with implementations of the present disclosure. As previously described, color identifying engine 151 can split video 121 into a plurality of frames (e.g., frame 320A, frame 320B, frame 320C, and frame 320D). Color identifying engine 151 can identify one or more overlaid text in each frame (e.g., Overlaid Text 1, Overlaid Text 2, and Overlaid Text 3 of frame 320A). For each frame of video 121, color identifying engine 151 can draw a bounding box around each overlaid text item in a respective frame. For example, bounding box 330 is drawn around Overlaid Text 1, bounding box 332 is drawn around Overlaid Text 2, and bounding box 334 is drawn around Overlaid Text 3. As previously described, the size and dimension may be dictated by a predetermined ratio indicating the number of pixels associated with the frame of video 121 (e.g., pixels 330B) that should be included in the bounding box (e.g., bounding box 330) for each pixel of the pixels (e.g., pixels 330A) associated with the overlaid text (e.g., Overlaid Text 1).

For each frame, color identifying engine 151 may obtain a bounding box average color value for each bounding box in a respective frame. For example, a bounding box average color value is obtained for bounding box 330, bounding box 332, and bounding box 334. Color identifying engine 151 can obtain the bounding box average color value for each bounding box by determining a color value for each pixel in a respective bounding box. Color identifying engine 151 can average the color value for all pixels in the respective bounding box. The pixels in the respective bounding box can include pixels associated with the contents of video 121 and those associated with the overlaid text within the bounding box.

Color identifying engine 151 can obtain, for each frame, a frame average color value. For example, a frame average color value is obtained for frames 320A, 320B, 320C, and 320D. Color identifying engine 151 can obtain the frame average color value for each frame by determining an average of all bounding box average color values in a respective frame. Color identifying engine 151 may aggregate the frame average color value of all the frames into a feature vector that can be used as input into a trained machine learning model to predict a color that would improve visual characteristics of the overlaid content of the video.

Figure 4:
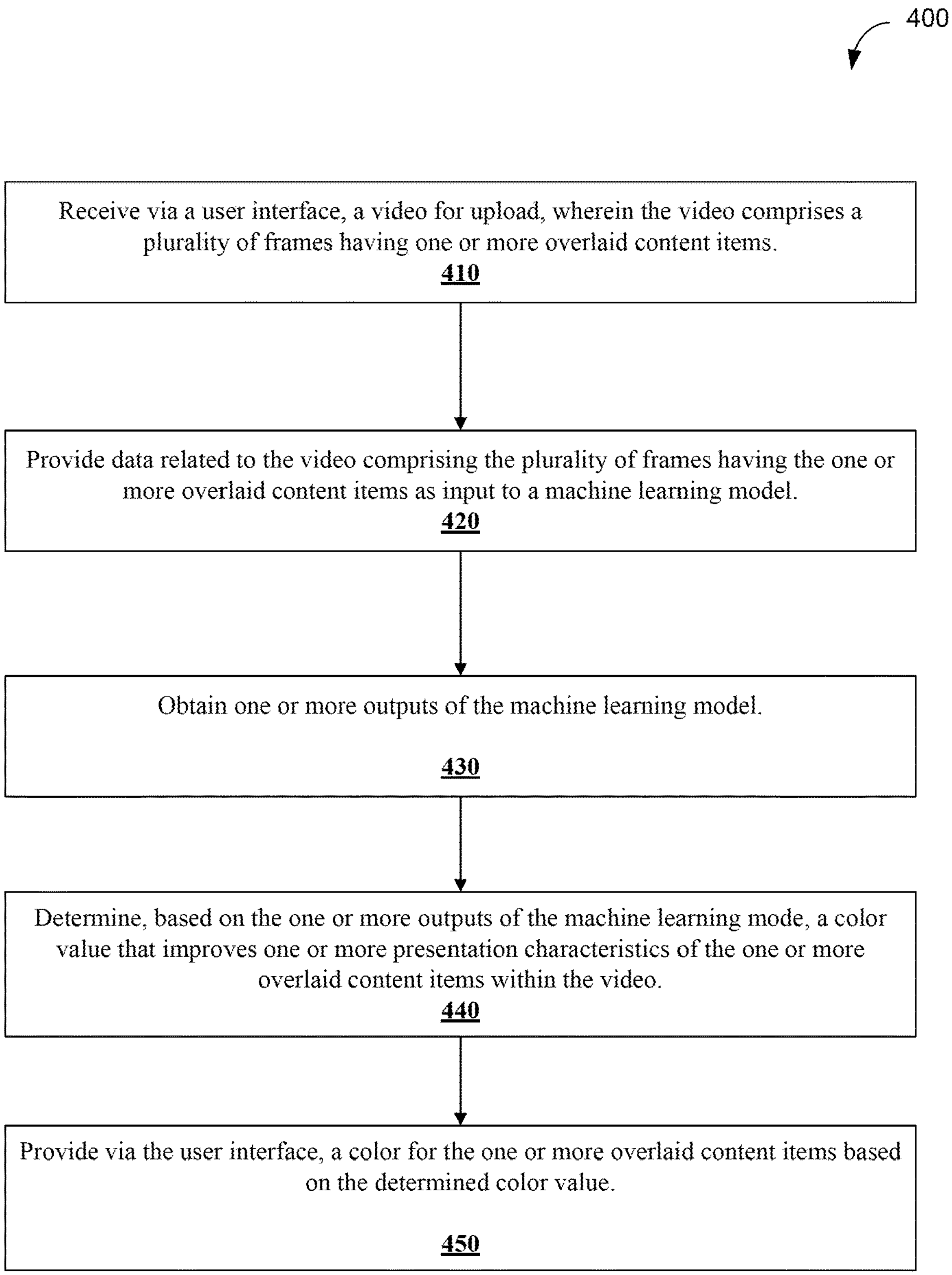
FIG. 4 depicts a flow diagram of an example method for automatically generating colors for overlaid content of media items, in accordance with implementations of the present disclosure.

FIG. 4 depicts a flow diagram of an example method 400 for automatically generating colors for overlaid content of media items, in accordance with implementations of the present disclosure. Method 400 can be performed by processing logic that can include hardware (circuitry, dedicated logic, etc.), software (e.g., instructions run on a processing device), or a combination thereof. In one implementation, some, or all of the operations of method 400 can be performed by one or more components of system 100 of FIG. 1. In some embodiments, some, or all of the operations of method 400 can be performed by color identifying engine 151, as described above.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts can be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

At block 410, processing logic receives via a user interface, a video for upload. The video includes a plurality of frames having overlaid content. In some embodiments, each overlaid content item within the video may be text. The video may be a short-form video.

At block 420, processing logic provides data related to the video including the plurality of frames having the overlaid content as input to a machine learning model. In particular, one or more overlaid text items may be identified in each frame. The processing logic may draw a bounding box around each identified overlaid text item. The bounding box may be drawn in a manner in which the number of pixels within the bounding box associated with displaying the video in the respective frame exceeds the number of pixels used to display the respective overlaid content within the bounding box. The processing logic may identify a first average color value of the pixels within each bounding box within the frame. In other words, the processing logic can obtain the first average color value (e.g., a bounding box average color value) for each bounding box in a frame. The first (bounding box) average color value may be based on an average of the color values of the pixels within the bounding box. In some embodiments, the processing logic may further identify, based on the first average color value associated with each bounding box within the frame, a second average value of the first average color values of the bounding boxes within the frame. In other words, the processing logic can obtain, for each frame of the video, the second average color value (e.g., a frame average color value). The frame average color value may be based on an average of the bounding box average color values in a frame. The processing logic can then create a feature vector of the video using each second (frame) average color value, where the data provided as input to the machine learning model includes the feature vector of the video. As discussed above, the feature vector of the video can be of a fixed length. Color value (e.g., a bounding box average color value and a frame average color value) may be a value from a Red, Green, and Blue (RGB) color model.

At block 430, processing logic obtains one or more outputs of the machine learning model. In some embodiments, each of the one or more outputs from the machine learning mode produces a value for a parameter of a color model. As previously described, an output layer of the machine learning model may be a layer with a neuron (or node) for each component of the color value (e.g., 3 neurons for the RGB color model). Thus, the output of each neuron of the output layer can produce a value for each component of the color value associated with the color model.

At block 440, processing logic determines, based on the one or more outputs of the machine learning mode, a color value that improves one or more presentation characteristics of the overlaid content within the video. As previously described, the processing logic may submit the data (e.g., feature vector) to the machine learning model and receive the one or more values, each associated with a component of a recommended color value. The processing logic may combine the one or more outputs to represent a recommended color value (e.g., the determined color value).

At block 450, processing logic provides, via the user interface, a color for the overlaid content based on the determined color value. Depending on the embodiment, the processing logic may further receive a color selection via the user interface. The color selection may be the provided color, a default color, or an arbitrary color. Based on the color selection, the processing logic may further update a color of overlaid content within the video.

Figure 5:
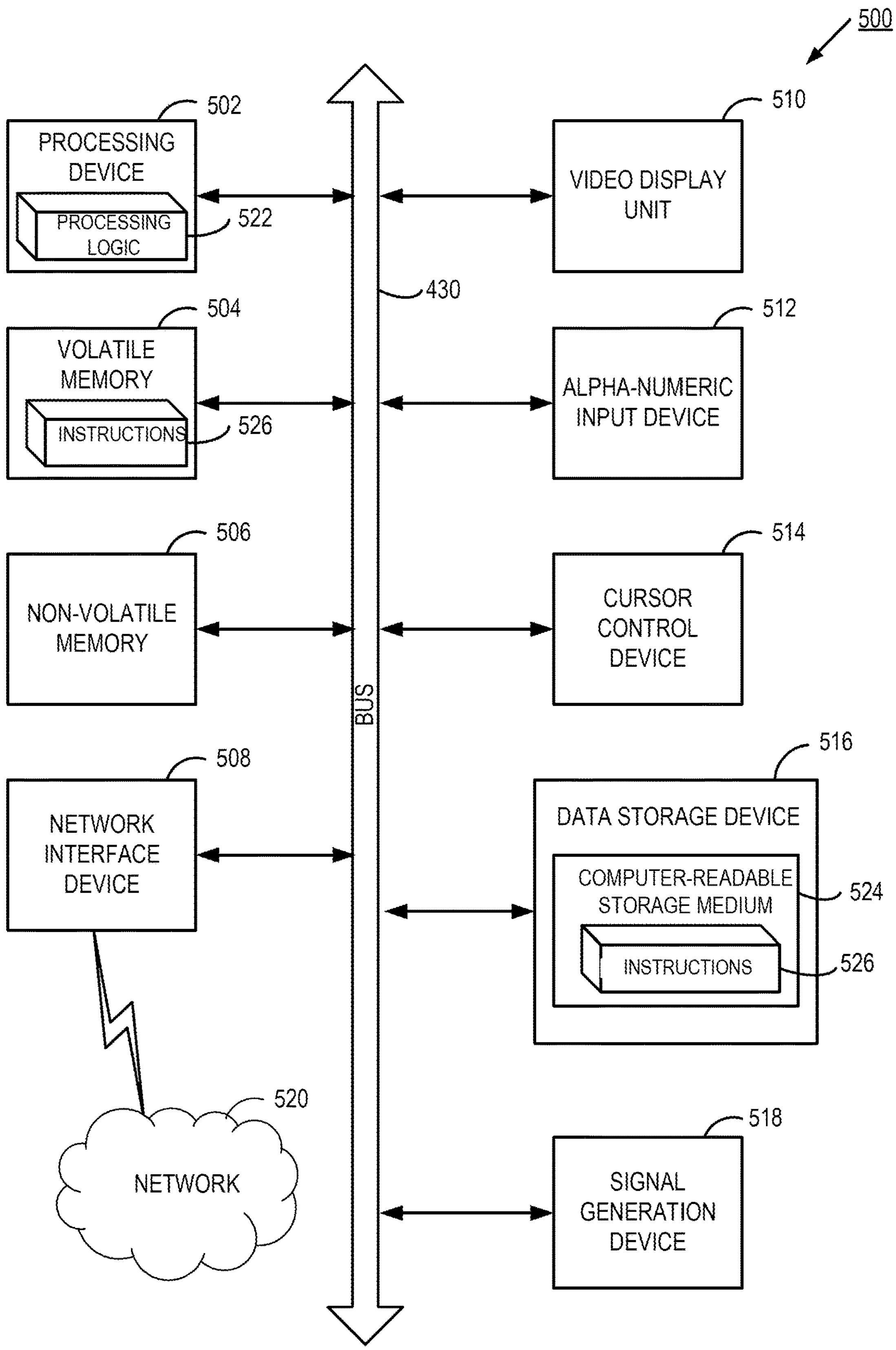
FIG. 5 is a block diagram illustrating an exemplary computer system, in accordance with implementations of the present disclosure.

FIG. 5 is a block diagram illustrating an exemplary computer system 500, in accordance with implementations of the present disclosure. The computer system 500 can correspond to platform 120 and/or client devices 102A-N, described with respect to FIG. 1. Computer system 500 can operate in the capacity of a server or an endpoint machine in endpoint-server network environment, or as a peer machine in a peer-to-peer (or distributed) network environment. The machine can be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processing device (processor) 502, a main memory 504 (e.g., read-only memory (ROM), flash memory, dynamic random access memory (DRAM) such as synchronous DRAM (SDRAM), double data rate (DDR SDRAM), or DRAM (RDRAM), etc.), a static memory 506 (e.g., flash memory, static random access memory (SRAM), etc.), and a data storage device 518, which communicate with each other via a bus 540.

Processor (processing device) 502 represents one or more general-purpose processing devices such as a microprocessor, central processing unit, or the like. More particularly, the processor 502 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 can also be one or more special-purpose processing devices such as an application specific integrated circuit (ASIC), a field programmable gate array (FPGA), a digital signal processor (DSP), network processor, or the like. The processor 502 is configured to execute instructions 505 (e.g., for providing color recommendations for overlaid text in a video) for performing the operations discussed herein.

The computer system 500 can further include a network interface device 508. The computer system 500 also can include a video display unit 510 (e.g., a liquid crystal display (LCD) or a cathode ray tube (CRT)), an input device 512 (e.g., a keyboard, and alphanumeric keyboard, a motion sensing input device, touch screen), a cursor control device 514 (e.g., a mouse), and a signal generation device 520 (e.g., a speaker).

The data storage device 518 can include a non-transitory machine-readable storage medium 524 (also computer-readable storage medium) on which is stored one or more sets of instructions 505 (e.g., for providing color recommendations for overlaid text in a video) embodying any one or more of the methodologies or functions described herein. The instructions can also reside, completely or at least partially, within the main memory 504 and/or within the processor 502 during execution thereof by the computer system 500, the main memory 504 and the processor 502 also constituting machine-readable storage media. The instructions can further be transmitted or received over a network 530 via the network interface device 508.

In one implementation, the instructions 505 include instructions for color recommendations for overlaid text in a video. While the computer-readable storage medium 524 (machine-readable storage medium) is shown in an exemplary implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding, or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

Reference throughout this specification to "one implementation," "one embodiment," "an implementation," or "an embodiment," means that a particular feature, structure, or characteristic described in connection with the implementation and/or embodiment is included in at least one implementation and/or embodiment. Thus, the appearances of the phrase "in one implementation," or "in an implementation," in various places throughout this specification can, but are not necessarily, referring to the same implementation, depending on the circumstances. Furthermore, the particular features, structures, or characteristics can be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component can be, but is not limited to being, a process running on a processor (e.g., digital signal processor), a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, circuits, modules, and so on have been described with respect to interact between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components can be combined into a single component providing aggregate functionality or divided into several separate sub-components, and any one or more middle layers, such as a management layer, can be provided to communicatively couple to such sub-components in order to provide integrated functionality. Any components described herein can also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Finally, implementations described herein include collection of data describing a user and/or activities of a user. In one implementation, such data is only collected upon the user providing consent to the collection of this data. In some implementations, a user is prompted to explicitly allow data collection. Further, the user can opt-in or opt-out of participating in such data collection activities. In one implementation, the collect data is anonymized prior to performing any analysis to obtain any statistical patterns so that the identity of the user cannot be determined from the collected data.

What is claimed is:

1. A method comprising:

receiving, via a user interface of a mobile application, a video for upload, wherein the video comprises a plurality of frames each having primary video content and one or more overlaid content items including additional information about the primary video content;

generating data related to the video based on a location of each overlaid content item of the one or more overlaid content items within a corresponding frame and an initial color of each overlaid content item within the corresponding frame;

providing the data related to the video as input to a machine learning model trained to generate, for each of the one or more overlaid content items, a respective improved color value based at least on a color of the primary video content behind a respective overlaid content item;

obtaining one or more outputs of the machine learning model, the one or more outputs comprising, for each of the one or more overlaid content items, the respective improved color value;

for each overlaid content item of the one or more overlaid content items, determining, based on the one or more outputs of the machine learning model, an improved color value that improves one or more presentation characteristics of the one or more overlaid content items within the video; and providing, via the user interface of the mobile application, a modified color for each of the one or more overlaid content items based on a respective improved color value.

2. The method of claim 1, wherein generating the data related to the video comprises:

generating a bounding box around each overlaid content item within a frame of the video;

identifying a first average color value of initial colors of pixels within each bounding box within the frame;

identifying, based on the first average color value associated with each bounding box within the frame, a second average color value of first average color values of bounding boxes within the frame; and creating a feature vector using second average color values of the plurality of frames of the video, wherein the data provided as input to the machine learning model comprises the feature vector.

3. The method of claim 2, wherein generating a bounding box around each overlaid content item within a frame of the video comprises:

for each overlaid content item within the frame, drawing a bounding box around a respective overlaid content item, wherein a number of pixels within the bounding box associated with displaying the video in the respective frame exceeds a number of pixels used to display the respective overlaid content in the frame.

4. The method of claim 2, wherein the feature vector is of a predefined length.

5. The method of claim 1, wherein the one or more overlaid content items of the video comprise at least one of a title of the video, a description of the video or one or more comments provided by viewers of the video.

6. The method of claim 1, further comprising identifying the one or more overlaid content items in the plurality of frames of the video using optical character recognition (OCR).

7. The method of claim 1, further comprising:

receiving, via the user interface, a color selection, wherein the color selection corresponds to one of: a modified color, a default color, or an arbitrary color; and updating, based on the color selection, an initial color of a respective overlaid content item within the video.

8. A system comprising:

a memory device; and a processing device coupled to the memory device, wherein the processing device is to perform operations comprising:

receiving, via a user interface of a mobile application, a video for upload, wherein the video comprises a plurality of frames each having primary video content and one or more overlaid content items including additional information about the primary video content;

generating data related to the video based on a location of each overlaid content item of the one or more overlaid content items within a corresponding frame and an initial color of each overlaid content item within the corresponding frame;

providing the data related to the video as input to a machine learning model trained to generate, for each of the one or more overlaid content items, a respective improved color value based at least on a color of the primary video content behind a respective overlaid content item;

obtaining one or more outputs of the machine learning model, the one or more outputs comprising, for each of the one or more overlaid content items, the respective improved color value;

for each overlaid content item of the one or more overlaid content items, determining, based on the one or more outputs of the machine learning model, an improved color value that improves one or more presentation characteristics of the one or more overlaid content items within the video; and providing, via the user interface of the mobile application, a modified color for each of the one or more overlaid content items based on a respective improved color value.

9. The system of claim 8, wherein generating the data related to the video comprises:

generating a bounding box around each overlaid content item within a frame of the video;

identifying a first average color value of initial colors of pixels within each bounding box within the frame;

identifying, based on the first average color value associated with each bounding box within the frame, a second average color value of first average color values of bounding boxes within the frame; and creating a feature vector using second average color values of the plurality of frames of the video, wherein the data provided as input to the machine learning model comprises the feature vector.

10. The system of claim 9, wherein generating a bounding box around each overlaid content item within a frame of the video comprises:

for each overlaid content item within the frame, drawing a bounding box around a respective overlaid content item, wherein a number of pixels within the bounding box associated with displaying the video in the respective frame exceeds a number of pixels used to display the respective overlaid content in the frame.

11. The system of claim 9, wherein the feature vector is of predefined length.

12. The system of claim 8, wherein the one or more overlaid content items of the video comprise at least one of a title of the video, a description of the video or one or more comments provided by viewers of the video.

13. The system of claim 8, wherein the processing device is to perform operations further comprising identifying the one or more overlaid content items in the plurality of frames of the video using optical character recognition (OCR).

14. The system of claim 8, wherein the processing device is to perform operations further comprising:

receiving, via the user interface, a color selection, wherein the color selection corresponds to one of: a modified color, a default color, or an arbitrary color; and updating, based on the color selection, an initial color of a respective overlaid content item within the video.

15. A non-transitory computer-readable medium comprising instructions that, responsive to execution by a processing device, cause the processing device to perform operations comprising:

receiving, via a user interface of a mobile application, a video for upload, wherein the video comprises a plurality of frames each having primary video content and one or more overlaid content items including additional information about the primary video content;

generating data related to the video based on a location of each overlaid content item of the one or more overlaid content items within a corresponding frame and an initial color of each overlaid content item within the corresponding frame;

providing the data related to the video as input to a machine learning model trained to generate, for each of the one or more overlaid content items, a respective improved color value based at least on a color of the primary video content behind a respective overlaid content item;

obtaining one or more outputs of the machine learning model, the one or more outputs comprising, for each of the one or more overlaid content items, the respective improved color value;

for each overlaid content item of the one or more overlaid content items, determining, based on the one or more outputs of the machine learning model, an improved color value that improves one or more presentation characteristics of the one or more overlaid content items within the video; and providing, via the user interface of the mobile application, a modified color for each of the one or more overlaid content items based on a respective improved color value.

16. The non-transitory computer-readable medium of claim 15, wherein generating the data related to the video comprises:

generating a bounding box around each overlaid content item within a frame of the video;

identifying a first average color value of initial colors of pixels within each bounding box within the frame;

identifying, based on the first average color value associated with each bounding box within the frame, a second average color value of the first average color values of bounding boxes within the frame; and creating a feature vector using second average color values of the plurality of frames of the video, wherein the data provided as input to the machine learning model comprises the feature vector.

17. The non-transitory computer-readable medium of claim 16, wherein generating a bounding box around each overlaid content within a frame of the video comprises:

for each overlaid content item within the frame, drawing a bounding box around a respective overlaid content item, wherein a number of pixels within the bounding box associated with displaying the video in the respective frame exceeds a number of pixels used to display the respective overlaid content in the frame.

18. The non-transitory computer-readable medium of claim 16, wherein the feature vector is of predefined length.

19. The non-transitory computer-readable medium of claim 15, wherein the one or more overlaid content items of the video comprise at least one of a title of the video, a description of the video or one or more comments provided by viewers of the video.

20. The non-transitory computer-readable medium of claim 15, wherein the processing device is to perform operations further comprising identifying the one or more overlaid content items in the plurality of frames of the video using optical character recognition (OCR).

* * * * *